(12) United States Patent
Hong et al.

(10) Patent No.: US 10,896,364 B1
(45) Date of Patent: Jan. 19, 2021

(54) STEEL ROPE FOR SECURING RFID TAG

(71) Applicant: YOKE INDUSTRIAL CORP., Taichung (TW)

(72) Inventors: Rong-Der Hong, Taichung (TW); Chien-Hung Lee, Taichung (TW)

(73) Assignee: YOKE INDUSTRIAL CORP., Taichung (TW)

( * ) Notice: Subject to any disclaimer, the term of this patent is extended or adjusted under 35 U.S.C. 154(b) by 0 days.

(21) Appl. No.: 16/722,869

(22) Filed: Dec. 20, 2019

(30) Foreign Application Priority Data

Oct. 3, 2019 (TW) .............................. 108135906 A (51) Int. Cl.
*B65C 7/00* (2006.01)
*G06K 19/077* (2006.01)
*G06K 19/07* (2006.01)
*G06K 19/063* (2006.01)

(52) U.S. Cl.
CPC ..... *G06K 19/07758* (2013.01); *G06K 19/063* (2013.01); *G06K 19/0723* (2013.01)

(58) Field of Classification Search
CPC ........................... G06K 19/063; G06K 19/005
See application file for complete search history.

(56) References Cited

U.S. PATENT DOCUMENTS

| | | | |
|---|---|---|---|
| 2010/0327710 A1* | 12/2010 | Kolton | G06K 19/041 312/223.1 |
| 2013/0247337 A1* | 9/2013 | Zimmel | B65C 7/001 24/367.1 |
| 2015/0007375 A1* | 1/2015 | Lee-Holowka | A45F 5/02 2/69 |

* cited by examiner

*Primary Examiner* — Hongmin Fan
(74) *Attorney, Agent, or Firm* — Tracy M Heims; Apex Juris, pllc.

(57) ABSTRACT

A RFID tag includes a metal plate member and a steel rope, wherein the metal plate member includes a first surface and the second surface which are opposite to each other, and has a punched portion and an unpunched portion. The punched portion forms at least one protruded sheet. The metal plate member has at least one protruded sheet protruding in a direction from the second surface toward the first surface to stand above the first surface of the unpunched portion, thereby to form a channel between the protruded sheet and a level corresponding to the first surface of the unpunched portion. The steel rope passes through the channel, and is clasped by the protruded sheet and first surface of the unpunched portion, so that a portion of the steel rope is curved from the first surface to the second surface.

11 Claims, 11 Drawing Sheets

STEEL ROPE FOR SECURING RFID TAG

BACKGROUND OF THE INVENTION

Technical Field

The present invention relates generally to a tag, and more particularly to a radio frequency identification (RFID) tag.

Description of Related Art

In general, except for paper or electronic catalogs, additional description of the product is enclosed with a package or printed on an appearance of products on the market, thereby allowing a user to know the characteristics of the products.

However, when the user buys the product, an original package of the product is usually thrown away directly, so that the user cannot acquire information related to the product from the package again. In order to solve this problem, an additional paper instruction manual is enclosed with the products having a complex structure or function, for the user to store for future reference. Most users do not store the paper instruction manual. As a result, it's very common that the user couldn't find the paper instruction manual when they need the information related to the product.

With the advantages in electronic technology, electronic tags are used for some products in order to provide the information related to the products to the user. Common electronic tags include an one-dimensional (1D) barcode, a two-dimensional (2D) barcode, and a radio frequency identification (RFID) tag, wherein the 1D barcode and the 2D barcode have a narrower range of application, and are easily unreadable due to wear and tear. RFID technique allows the information related to the product to be written in or acquired from the RFID tags and to be identified by a radio signal. The radio signal sends out the information about the product which attached in the tag via electromagnetic fields of the frequencies of the radio wave, in order to automatically identify and acquire the information of the products.

Currently, the RFID tag includes a plastic case and a detachable metal chain, wherein a RFID antenna is mounted in the plastic case, and the plastic case has a closed-loop structure, allowing an end of the metal chain to insert through the plastic case to be combined with another end thereof to form a metal chain loop. The metal chain loop which is connected to the plastic case could loop, sleeve, or encircle a certain portion of the product. As a result, the user could easily acquire the information of the product via the RFID tag.

Although the RFID tag could solve the above-mentioned problem, the metal chain loop of the conventional RFID tag, which is connected (e.g. loop, sleeve, or encircle) to the product, is easily broken when it is pulled by an external force, causing that the RFID tag is dropped or getting lost. Therefore, the conventional RFID tag still needs improvement.

BRIEF SUMMARY OF THE INVENTION

In view of the above, the primary objective of the present invention is to provide a RFID tag including a steel rope, wherein two ends of the steel rope are respectively fastened to the RFID tag and the product in order to avoid the RFID tag disengaging from the product or getting lost when it is pulled by an external force, improving an existing issue of the conventional RFID tag.

The inventive subject matter provides a RFID tag including a metal plate member and a steel rope. The metal plate member includes a first surface and a second surface which are opposite to each other, and has a punched portion and an unpunched portion, wherein the punched portion forms at least one protruded sheet. The metal plate member has at least one protruded sheet protruding in a direction from the second surface to the first surface to stand above the first surface of the unpunched portion. The steel rope passes through the channel and is clasped by the at least one protruded sheet and the first surface together, and a portion of the steel rope is curved from the first surface toward the second surface.

By respectively fixing the two ends of the steel rope to the RFID tag and the product, the RFID tags could be prevented from dropping or disengaging from the product or getting lost due to be pulled by the external force, solving the problem of the conventional RFID tag. Thereby, a manufacturer could easily and firmly connect the RFID tag and the product, and the user could acquire the information related to the product by utilizing the RFID reader.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1A:
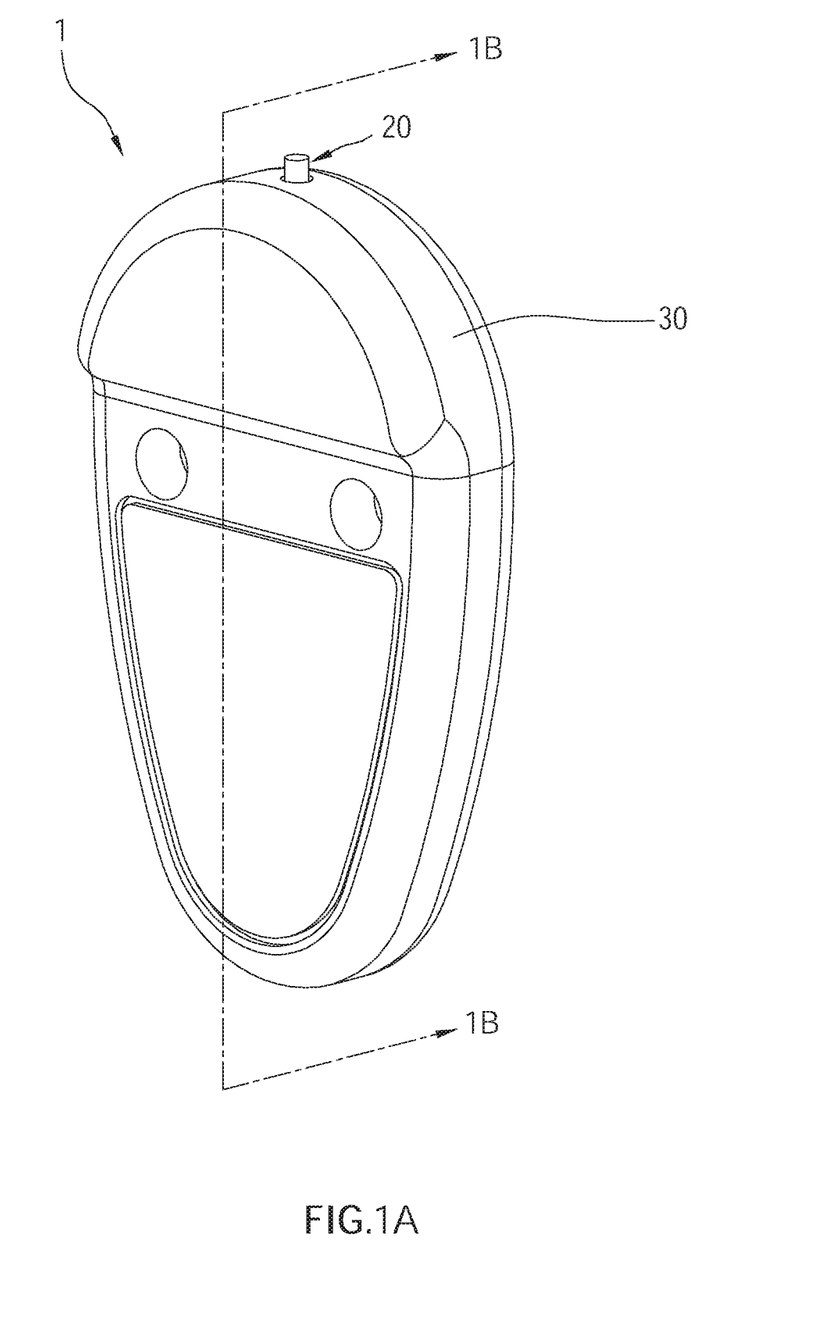
FIG. 1A is a perspective view of the RFID tag of an embodiment according to the present invention.
Figure 1B:
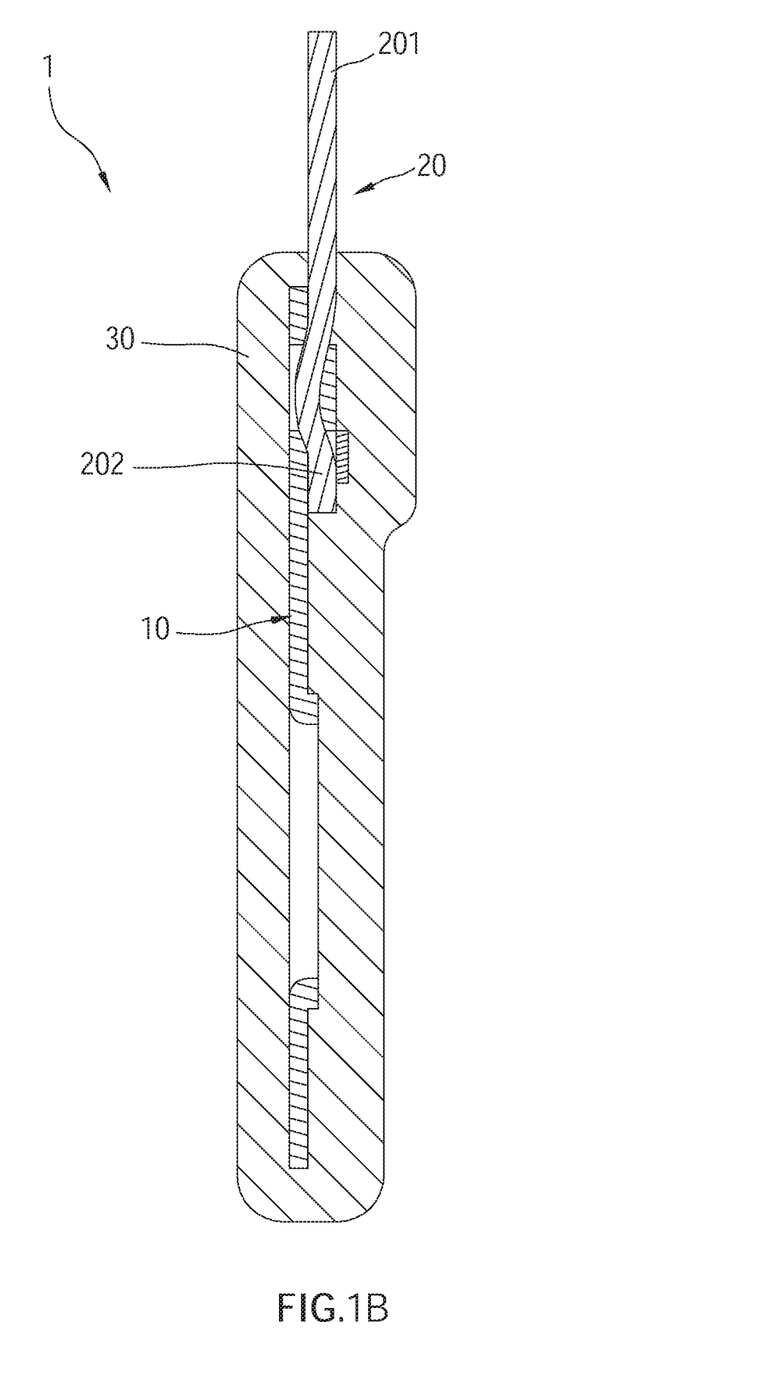
FIG. 1B is a sectional view taken along the line 1B-1B of FIG. 1A.

Referring to FIG. 1A and FIG. 1B, FIG. 1A is a perspective view of a radio frequency identification tag 1 (hereinafter referred to as "RFID tag") of an embodiment according to the present invention; FIG. 1B is a sectional view of the RFID tag 1, which is taken along the line 1B-1B of FIG. 1A.

In FIG. 1A and FIG. 1B, the RFID tag 1 includes a metal plate member 10, a steel rope 20, and a case 30. In the current embodiment, the case 30 covers the metal plate member 10, and a free end 201 of the steel rope 20 is exposed outside the case. In the current embodiment, the RFID tag 1 includes a RFID component (not shown) mounted in the case 30 for accessing an information related to a product (not shown), wherein the information related to the product could be read by utilizing a RFID reader.

Referring to FIG. 2 to FIG. 5, the metal plate member 10 includes a first surface 101 and a second surface 102 which face opposite directions, and has a punched portion and an unpunched portion, wherein the punched portion forms a protruded sheet 12 protruding in a direction from the second surface 102 to the first surface 101 to stand above the first surface 101 of the unpunched portion, thereby to form a channel 13 between the protruded sheet 12 and a level corresponding to the first surface 101 of the unpunched portion. In the current embodiment, the protruded sheet 12 is formed by punching the metal plate member 10 at a punched position P of the metal plate member 10 in the direction from the second surface 102 to the first surface 101. During the process of punching, the protruded sheet 12 protrudes in the direction from the second surface 102 to the first surface 101, thereby forms a punched cavity 122 at the punched position P.

Figure 5:
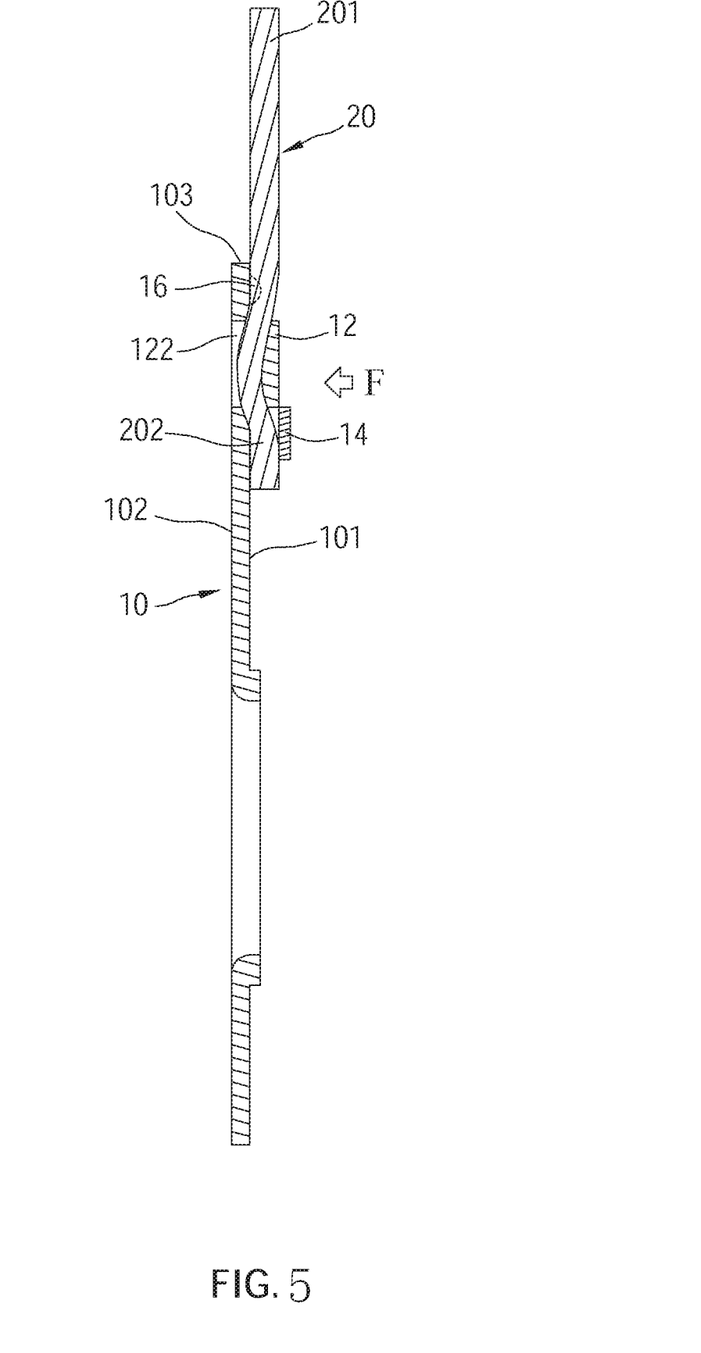
FIG. 5 is similar to FIG. 4, showing the variation of the steel rope when the external force is applied to the RFID tag.

The steel rope 20 passes through the channel 13 and is clasped by the protruded sheet 12 and the first surface 101 of the unpunched portion. In the current embodiment, a portion of the steel rope 20 is curved from the first surface 101 toward the second surface 102. In the current embodiment, the protruded sheet 12 is pressed by an external force F from the first surface 101 toward the second surface 102, so that the portion of the steel rope 20 is curved from the first surface 101 toward the second surface 102 at the punched cavity 122, as shown in FIG. 5.

Figure 2:
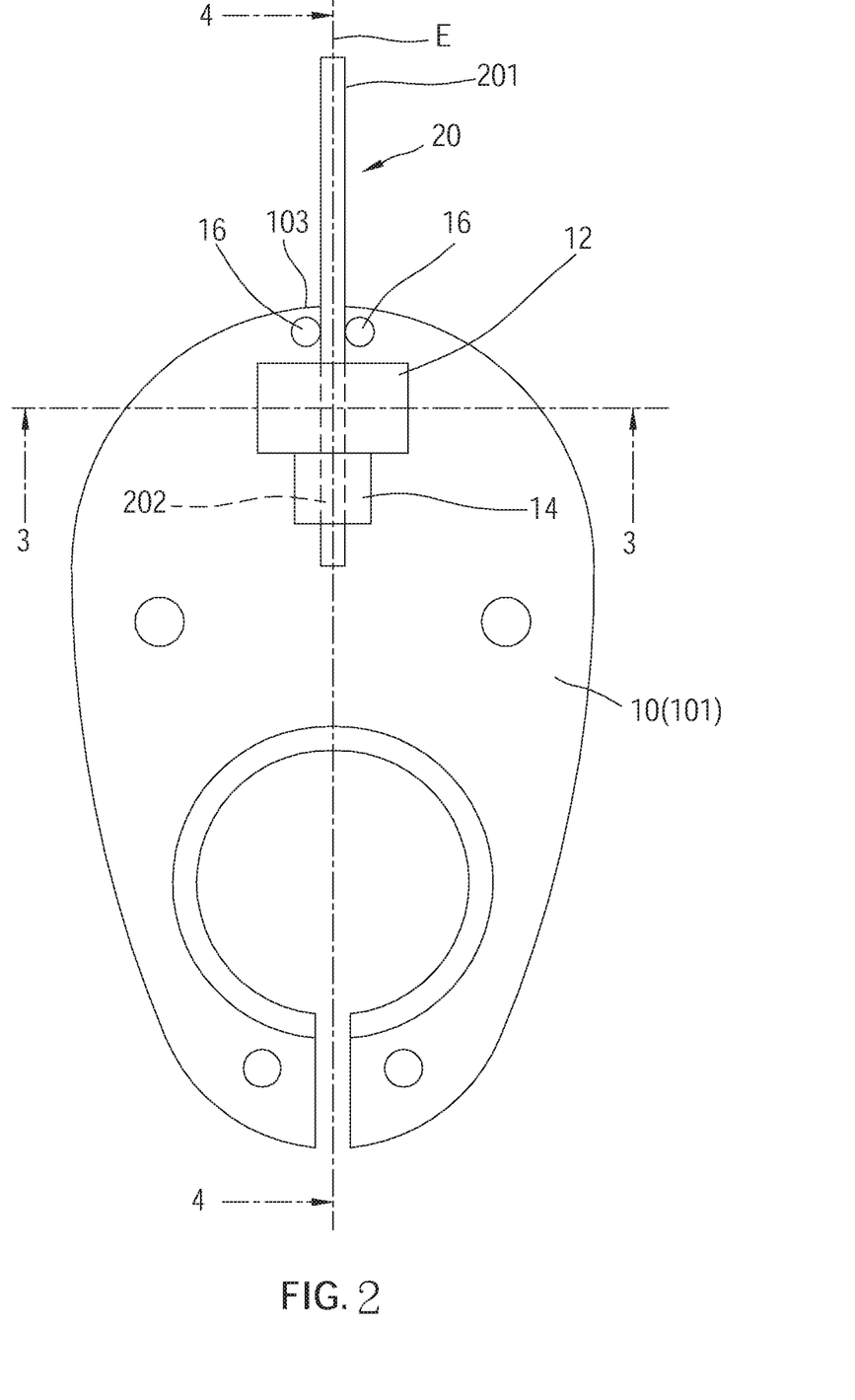
FIG. 2 is a front view of the RFID tag of the embodiment according to the present invention, showing partial components of the RFID tag, wherein the case is omitted.
Figure 3:
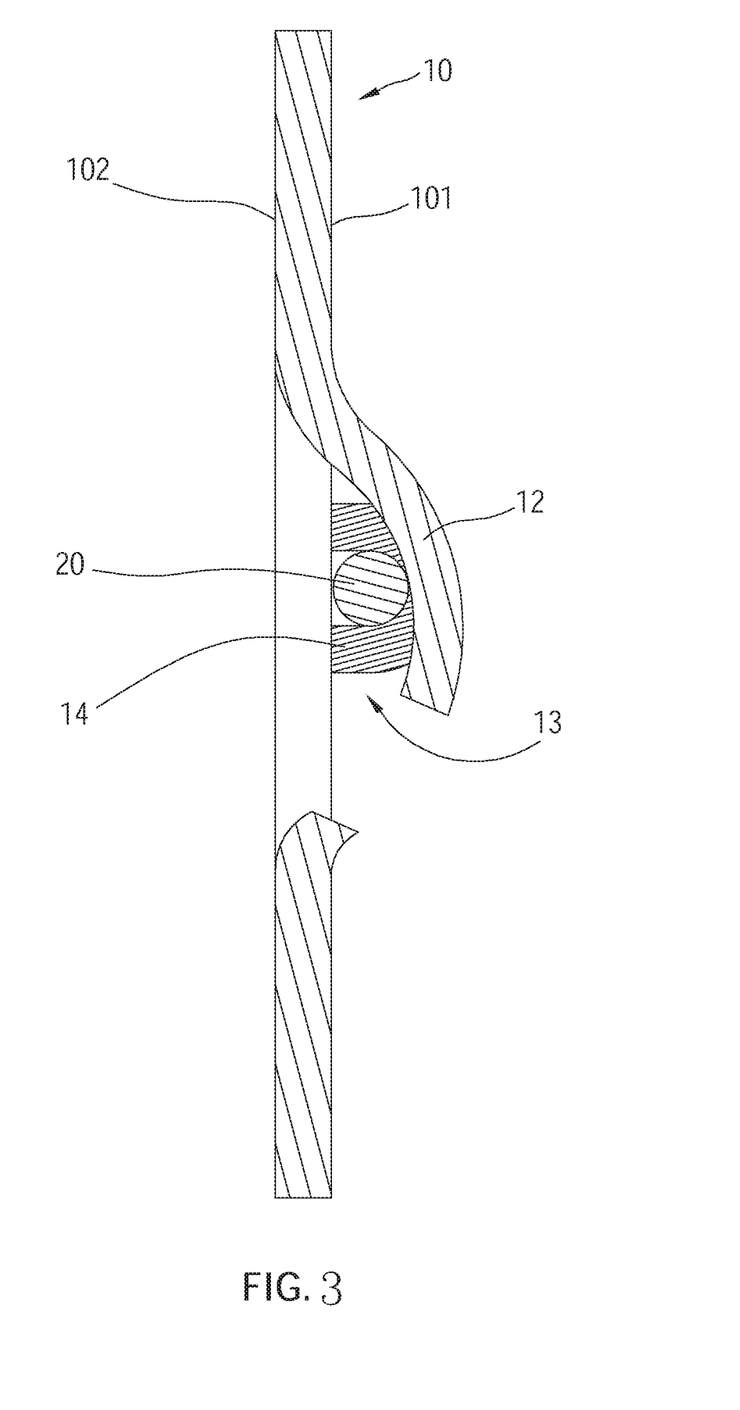
FIG. 3 is a sectional view taken along the line 3-3 of FIG. 2.
Figure 4:
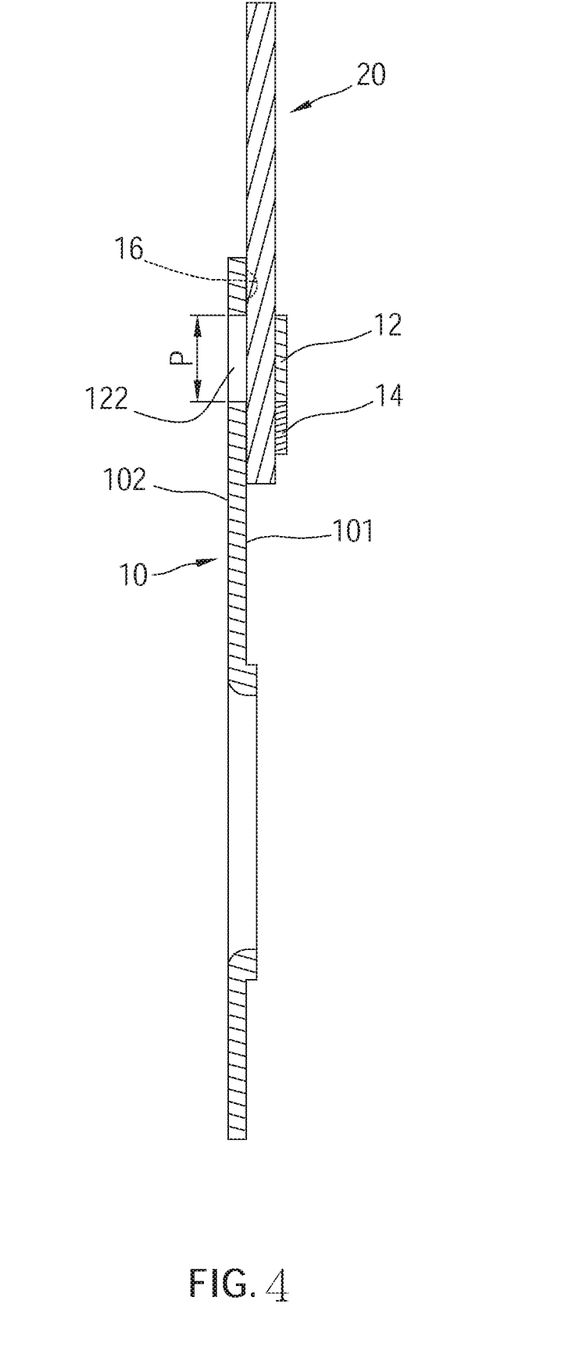
FIG. 4 is a sectional view taken along the line 4-4 of FIG. 2.

Referring to FIG. 2, FIG. 4, and FIG. 5 again, the metal plate member 10 includes a plurality of protruding members 16 protruding from the first surface 101 of the unpunched portion. In the current embodiment, the plurality of protruding members 16 includes two protruding members, and the steel rope 20 is disposed between the two protruding members 16. In the current embodiment, the protruding members 16 are located between the protruded sheet 12 and an edge 103 of the metal plate member 10 which is close to the free end 201 of the steel rope 20, and align on two lateral sides of an extension line E of the channel 13 for firmly disposing the steel rope 20 on the first surface 101 of the unpunched portion of the metal plate member 10. Besides, during the process of injection moulding of the case 30 subsequently, the steel rope 20 could not easily deviate from a predetermined position, enhancing manufacturing efficiency and yield.

In the current embodiment, the RFID tag 1 further includes a clasping sleeve 14 fixed to a fastened end 202 of the steel rope 20, wherein the fastened end 202 passes through the channel 13, so that the fastened end 202 of the steel rope 20 clasped on the metal plate member 10 is hard to disengage from the metal plate member 10, enhancing a durability and a reliability of the RFID tag 1. In an embodiment, the clasping sleeve 14 contacts the protruded sheet 12, avoiding the fastened end 202 of the steel rope 20 disengaging from the metal plate member 10.

Figure 6:
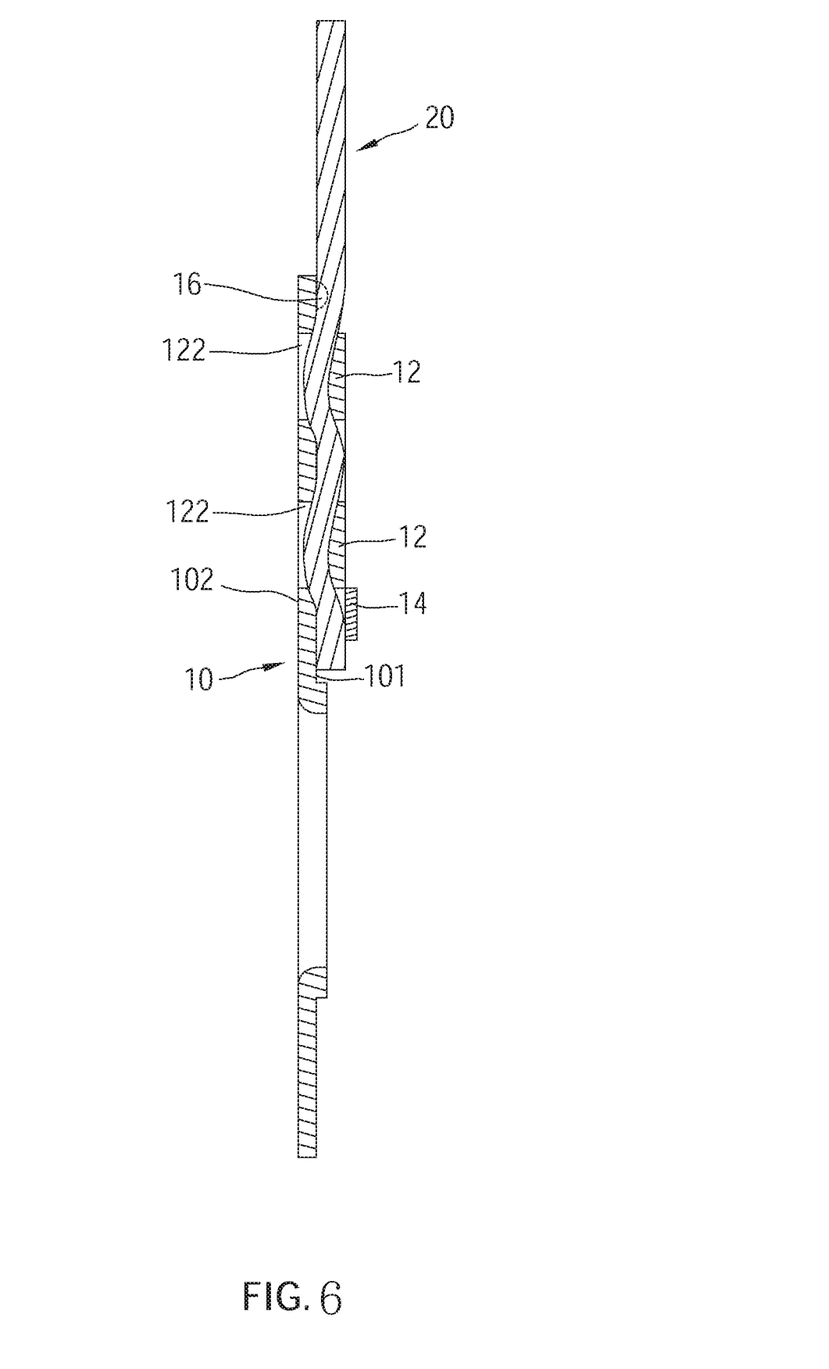
FIG. 6 is similar to FIG. 5, showing the RFID tag of another embodiment according to the present invention.

Referring to FIG. 6, in another embodiment according to the present invention, a number of the protruded sheet 12 is two. The channel 13 is formed by the two protruded sheets 12 and the level corresponding to the first surface 101 of the unpunched portion, and the steel rope 20 passes through the channel 13. The steel rope 20 is clasped by the two protruded sheets 12 and the first surface 101 of the unpunched portion. In the current embodiment, the durability and the reliability of the RFID tag 1 could be enhanced by increasing the amount of the protruded sheets 12. In an embodiment, the clasping sleeve 14 contacts at least one of the two protruded sheets 12, avoiding the fastened end 202 of the steel rope 20 disengaging from the metal plate member 10.

Figure 7A:
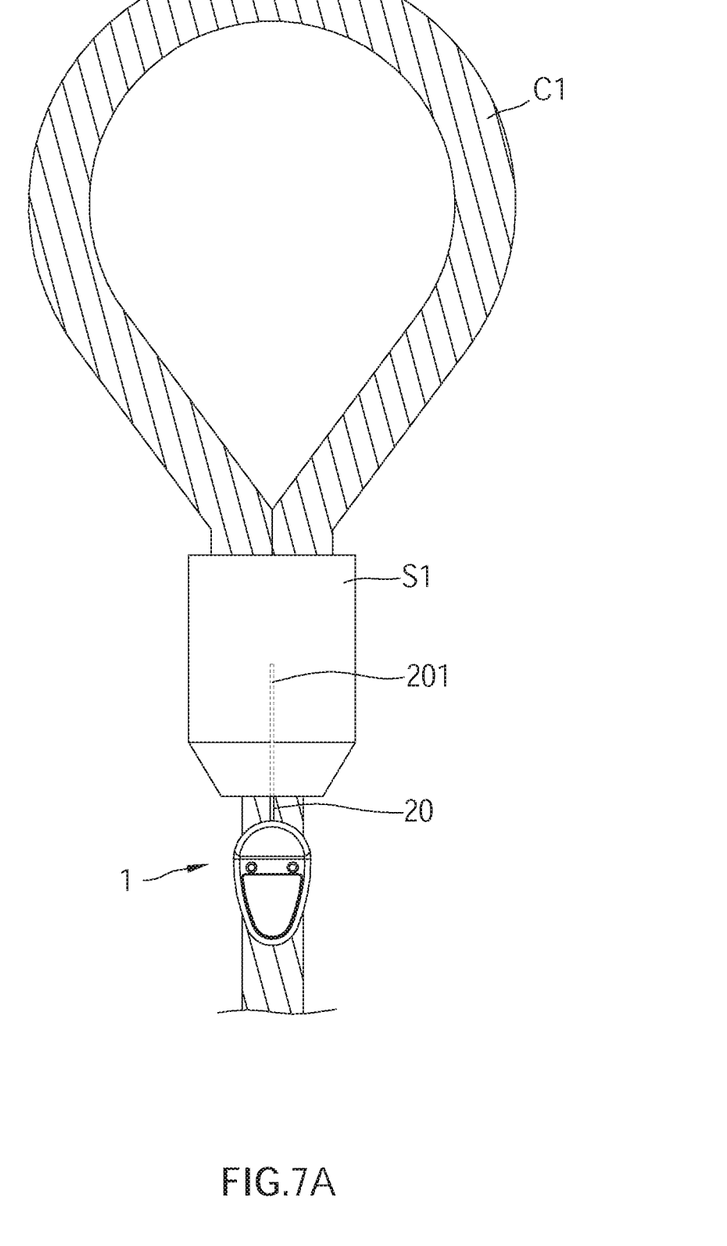
FIG. 7A is a schematic view, showing the status of use of the RFID tag according to the present invention.
Figure 7B:
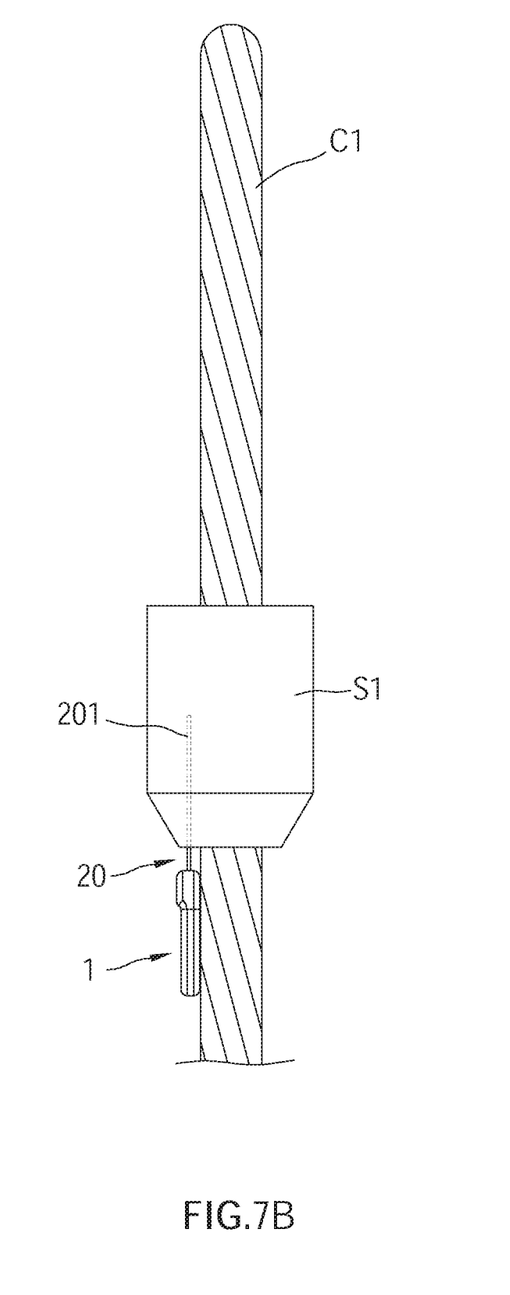
FIG. 7B is a side view of FIG. 7A.

The FIG. 7A and FIG. 7B illustrate a status of use of the RFID tag 1 of the embodiment according to the invention. In FIG. 7A and FIG. 7B, the free end 201 of the steel rope 20 is attached to a rope sleeve S1 of a rope loop C1.

Figure 8A:
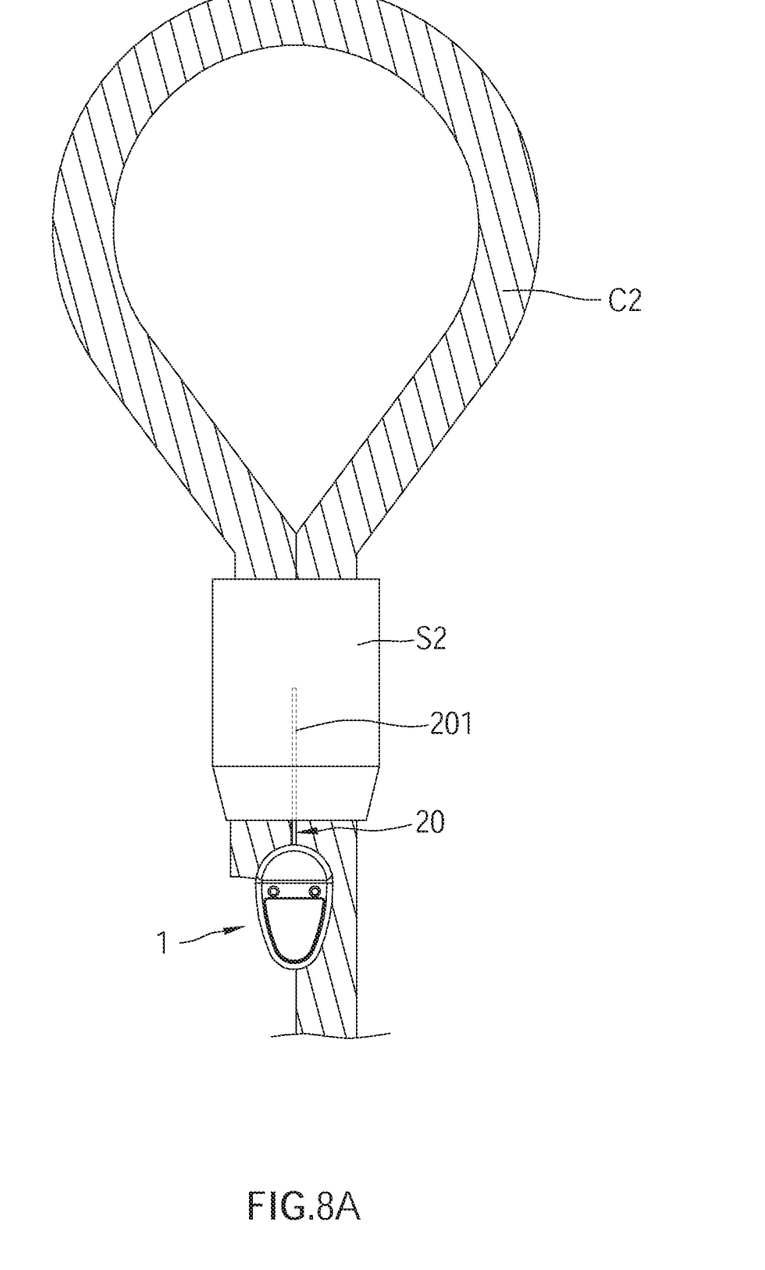
FIG. 8A is a schematic view, showing another status of use of the RFID tag according to the present invention.
Figure 8B:
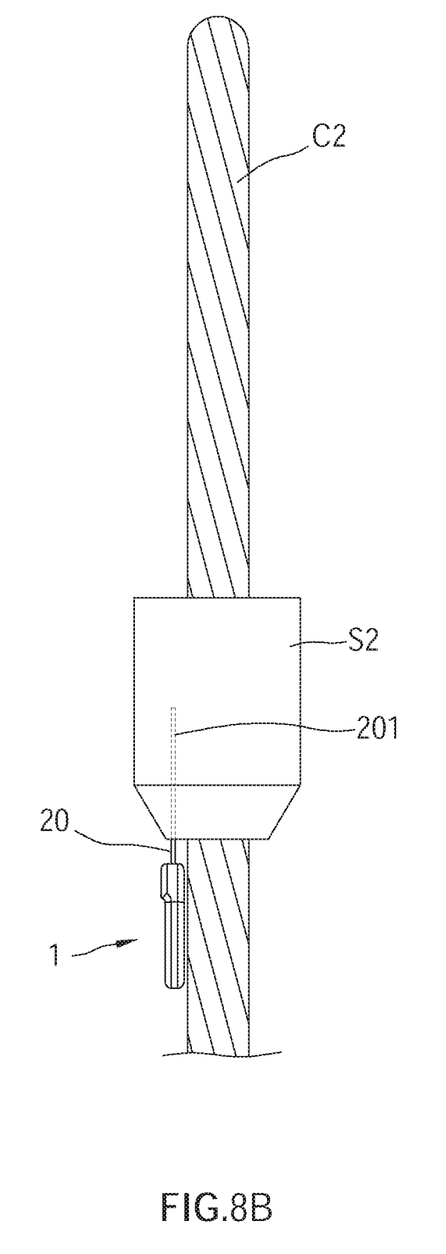
FIG. 8B is a side view of FIG. 8A.

The FIG. 8A and FIG. 8B illustrates another status of use of the RFID tag 1 of the embodiment according to the invention. In FIG. 8A and FIG. 8B, the free end 201 of the steel rope 20 is attached to a rope sleeve S2 of a rope loop C2.

With the aforementioned design, by respectively connecting the two ends of the steel rope of the RFID tag to the RFID tag and the product, the RFID tag could be prevented from disengaging or dropping from the product or getting lost when the RFID tag is pulled by the external force, solving the problem of the conventional RFID tag. In this way, the manufacturer could easily fasten the RFID tag and the product firmly, and the user could acquire the information related to the product by utilizing the RFID reader.

It must be pointed out that the embodiment described above is only a preferred embodiment of the present invention. All equivalent structures which employ the concepts disclosed in this specification and the appended claims should fall within the scope of the present invention.

What is claimed is:

1. A RFID tag, comprising:
    a metal plate member comprising a first surface and a second surface which are opposite to each other, and having a punched portion and an unpunched portion, wherein the punched portion forms at least one protruded sheet; the metal plate member has at least one protruded sheet protruding in a direction from the second surface to the first surface to stand above the first surface of the unpunched portion thereby to form a channel between the at least one protruded sheet and a level corresponding to the first surface of the unpunched portion; and
    a steel rope passing through the channel and clasped by the at least one protruded sheet and the first surface of the unpunched portion, wherein a portion of the steel rope is curved from the first surface toward the second surface.

2. The RFID tag of claim 1, further comprising a clasping sleeve fixed to a fastened end of the steel rope, wherein the fastened end passes through the channel.

3. The RFID tag of claim 2, wherein the clasping sleeve contacts the at least one protruded sheet.

4. The RFID tag of claim 1, wherein the metal plate member has a plurality of protruding members protruding from the first surface of the unpunched portion, and the steel rope is disposed between the plurality of protruding members.

5. The RFID tag of claim 4, wherein the plurality of protruding members is located between the at least one protruded sheet and an edge of the metal plate member, and the plurality of protruding members align on the two lateral sides of an extension line of the channel.

6. The RFID tag of claim 1, wherein the at least one protruded sheet is formed by punching the metal plate member at least one punched position of the metal plate member in the direction from the second surface to the first surface.

7. The RFID tag of claim 6, wherein during the process of punching, the at least one protruded sheet is protruded in the direction from second surface to the first surface, thereby forms a punched cavity at the at least one punched position;

a portion of the steel rope is curved from the first surface toward the second surface at the punched cavity.

8. The RFID tag of claim 1, wherein a number one of the protruded sheet is two; the channel is formed between the two protruded sheets and the level corresponding to the first surface; the steel rope passes through the channel, and the steel rope is clasped by the two protruded sheets and the first surface of the unpunched portion.

9. The RFID tag of claim 1, further comprising a case covering the metal plate member, thereby a free end of the steel rope is exposed outside the case.

10. The RFID tag of claim 9, further comprising a RFID component disposed in the case.

11. The RFID tag of claim 9, wherein the free end of the steel rope is fixed to a rope sleeve of a rope loop.

* * * * *